(12) United States Patent
Takahashi

(10) Patent No.: US 7,669,496 B2
(45) Date of Patent: Mar. 2, 2010

(54) DRIVING FORCE TRANSMISSION APPARATUS AND SHEET CONVEYANCE APPARATUS

(75) Inventor: Yoshikazu Takahashi, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 682 days.

(21) Appl. No.: 11/567,840

(22) Filed: Dec. 7, 2006

(65) Prior Publication Data

US 2007/0119280 A1 May 31, 2007

Related U.S. Application Data

(63) Continuation of application No. PCT/JP2006/320044, filed on Sep. 29, 2006.

(30) Foreign Application Priority Data

Sep. 30, 2005 (JP) ............... 2005-286972
Sep. 27, 2006 (JP) ............... 2006-262979

(51) Int. Cl.
*F16H 1/20* (2006.01)

(52) U.S. Cl. ............ 74/337; 74/405; 271/114; 192/46; 192/56.61

(58) Field of Classification Search ............ 192/69.81, 192/39, 56.61; 74/412 TA; 271/10.13
See application file for complete search history.

(56) References Cited

U.S. PATENT DOCUMENTS

| | | | | |
|---|---|---|---|---|
| 1,780,858 A | * | 11/1930 | Bearens | 74/359 |
| 2,320,757 A | * | 6/1943 | Sinclair et al. | 74/337 |
| 3,433,337 A | * | 3/1969 | Salter | 192/46 |
| 7,024,137 B2 | | 4/2006 | Nittani et al. | 399/222 |
| 7,215,909 B2 | | 5/2007 | Nittani et al. | 399/222 |
| 2002/0007688 A1 | * | 1/2002 | Punko | 74/405 |

FOREIGN PATENT DOCUMENTS

| | | |
|---|---|---|
| JP | 1-50665 | 12/1975 |
| JP | 10-142996 | 5/1998 |
| JP | 10-220550 | 8/1998 |
| JP | 2000-029347 | 1/2000 |
| JP | 2001-173642 | 6/2001 |
| JP | 2002-70981 | 3/2002 |

(Continued)

OTHER PUBLICATIONS

International Preliminary Report on Patentability, issued by WIPO, on Apr. 10, 2008, in PCT/JP2006-320044.

*Primary Examiner*—Sherry L Estremsky
*Assistant Examiner*—Edwin A. Young
(74) *Attorney, Agent, or Firm*—Fitzpatrick, Cella, Harper & Scinto

(57) ABSTRACT

A driving force transmission apparatus has a driving gear; a driven gear; a toothed clutch transferring the driving force from driving gear to driven gear and which includes driving-side and driven-side ratchets that are movable in the axial direction of the clutch; and a compression spring biasing driven-side ratchet toward driving-side ratchet. When the tip end of the pawl of the driven-side ratchet is at the same position as the tip end of the pawl of the driving-side ratchet in the axial direction of the toothed clutch, the compression spring biasing force acts on the driven-side ratchet. And when the driven-side ratchet fully engages the driving-side ratchet, the biasing force does not act on the driven side ratchet.

22 Claims, 10 Drawing Sheets

FOREIGN PATENT DOCUMENTS

| | | |
|---|---|---|
| JP | 2004-12523 | 1/2004 |
| JP | 2004-252007 | 9/2004 |
| JP | 3-107480 | 2/2005 |
| JP | 2005-80329 | 3/2005 |
| JP | 2005-266105 | 9/2005 |

\* cited by examiner

DRIVING FORCE TRANSMISSION APPARATUS AND SHEET CONVEYANCE APPARATUS

This application is a continuation of International Application No. PCT/JP2006/320044 filed on Sep. 29, 2006, which claims the benefit of Japanese Patent Application No. 2005-286972 filed on Sep. 30, 2005, and No. 2006-262979 filed on Sep. 27, 2006.

BACKGROUND OF THE INVENTION

1. Field of the Invention

The present invention relates to a driving force transmission apparatus having a toothed clutch that transmits a driving force received from a driving source, and a sheet conveyance apparatus.

2. Description of the Related Art

An image forming apparatus, such as a copier, a printer, a facsimile machine or a multifunctional apparatus having all these functions, mounts a thermal fixing device and a sheet conveyance mechanism, such as a recording material conveying belt mechanism. This sheet conveyance mechanism includes a sheet conveyance roller (or belt), which forms a sheet conveyance nip portion; a drive motor, for driving a sheet conveyance roller; and a driving force transmission mechanism, which transfers the driving force produced by a driving motor to the sheet conveyance roller.

When the image forming apparatus is abnormally halted because of a sheet jam in the sheet conveying mechanism and the sheet is caught at the conveyance nip portion, the sheet must be manually removed by a user, i.e., the jam must be cleared by the user. While the jam is being cleared, the sheet conveyance roller is rotated by friction between it and the sheet. At this time, because of the operating arrangement of the image forming apparatus, a driving force generated by the rotation of the sheet conveyance roller is transmitted to the driving motor via the driving force transmission mechanism, that is, a load produced by the rotation is imposed on the gear of the driving force transmission mechanism and thence on the driving motor. Therefore, removing the sheet is difficult and the sheet may sometimes be torn.

In order to reduce such a load, a driving force transmission mechanism having a function in which it is able to stop transmitting a driving force may be provided between the driving motor and the sheet conveyance roller. A toothed clutch is one example of such a driving force transmission mechanism. A toothed clutch includes a driving-side ratchet and a driven-side ratchet that are biased in the direction in which they are coupled. Thus, when the driving motor is rotated in the sheet conveying direction, the driving-side ratchet and the driven-side ratchet engage each other to transmit the driving force produced by the driving motor to the sheet conveyance roller. On the other hand, when a jam is being cleared and the sheet conveyance roller is rotated in the direction opposite to that in which a sheet is conveyed, the pawl of the driven-side ratchet slides over the pawl of the driving-side ratchet, so that the driven-side ratchet is not rotated and transmission of the driving force from the sheet conveyance roller to the driving motor is prevented. In this case, since the load imposed on a jammed sheet is comparatively small, a user can easily remove the sheet from the sheet nip portion.

However, for the conventional art described above, there are the following problems.

A user must rotate the driven-side ratchet forward a number of times when clearing a jam where a sheet is caught at the conveyance nip portion of the sheet conveyance roller. Therefore, the pawl of the driven-side ratchet must slide over the pawl of the driving-side ratchet many times. And since the driven-side ratchet and the driving-side ratchet are biased forward by a spring, in the direction in which they are coupled, the ratchet pawls forcefully strike each other each time the pawl of the driven-side ratchet slides over the pawl of the driving-side ratchet, and an impulsive sound (an action sound) is produced. It is assumed that this impulsive sound will frequently cause user discomfort.

As means for preventing the generation of such an impulsive sound, there is an arrangement whereby, when a user opens the cover of an apparatus to clear a jam, a lever that interlocks with the cover reversely impels the pawl of a driven-side ratchet separating, against the biasing force exerted by an biasing spring, away from the pawl of a driving-side ratchet (see Japanese Patent Application Laid-Open No. H10-142996). According to this arrangement, since the ratchet pawls do not forcefully strike each other while the user is removing the jam, the occurrence of the impulsive sound can be prevented. However, since a lever and an interlocking mechanism for securing the main body of the apparatus to the lever must be additionally provided, the number of parts is increased.

A pressure release mechanism is also proposed whereby, when a sheet jam has occurred, a drive motor is rotated in reverse, in the direction opposite that in which a sheet is normally conveyed, to remove the pressure imposed on a conveyance nip portion (see Japanese Patent Application Laid-Open No. 2000-029347). According to this arrangement, since no pressure is imposed on the conveyance nip portion while the jam is being cleared, the process can be easily performed.

However, the pressure release mechanism, for example, may not work, as in a case wherein power to the image forming apparatus is turned off during the image forming processing. At this time, while a user is clearing the jam, the ratchet pawls would strike each other and produce the above described impulse sound.

Further, according to the arrangement whereby the pressure imposed on the conveyance nip portion is released by rotating the driving motor in reverse, in the direction opposite to that in which a sheet is conveyed, the driving-side ratchet pawl will slide over the driven-side ratchet pawl each time the pressure release procedure is performed. And thus, an impulse sound will still be generated by the ratchet pawls.

SUMMARY OF THE INVENTION

A purpose of the present invention is to provide a driving force transmission apparatus that can suppress the occurrence of an impulsive sound, at the coupling portion of a ratchet mechanism, without increasing the number of parts, and a sheet conveyance apparatus.

Another purpose of the present invention is to provide driving force transmission apparatus including a driving gear which rotates by receiving a driving force from a driving source, a driven gear which rotates by rotation of the driving gear, a toothed clutch which transmits the driving force from the driving source from the driving gear to the driven gear, the toothed clutch including a driving-side ratchet and a driven-side ratchet engageable with the driving-side ratchet and movable between a first position and a second position in an axial direction of the toothed clutch, the first position being a position in which the driven-side ratchet completely engages with the driving-side ratchet in the axial direction of the toothed clutch, the second position being a position in which a tip end of a pawl of the driven-side ratchet is located at a position which is the same as a tip end of a pawl of the driving-side ratchet in the axial direction of the toothed clutch, and an biasing member which biases the driven-side ratchet toward the driving-side ratchet, wherein, when the driven-side ratchet is located at the second position, an biasing force by the biasing member acts on the driven-side ratchet, or when the driven-side ratchet is located at the first position, the biasing force by the biasing member does not act on the driven-side ratchet.

A further purpose of the present invention is to provide a sheet conveyance apparatus including a driving gear which rotates by receiving a driving force from a driving source, a driven gear which rotates by rotation of the driving gear, a toothed clutch which transmits the driving force from the driving source from the driving gear to the driven gear, the toothed clutch including a driving-side ratchet and a driven-side ratchet engageable with the driving-side ratchet and movable between a first position and a second position in an axial direction of the toothed clutch, the first position being a position in which the driven-side ratchet completely engages with the driving-side ratchet in the axial direction of the toothed clutch, the second position being a position in which a tip end of a pawl of the driven-side ratchet is located at a position which is the same as a tip end of a pawl of the driving-side ratchet in the axial direction of the toothed clutch, a sheet conveyance roller which rotates in associated with the driven gear and an biasing member which biases the driven-side ratchet toward the driving-side ratchet, wherein, when the driven-side ratchet is located at the second position, an biasing force by the biasing member acts on the driven-side ratchet, or when the driven-side ratchet is located at the first position, the biasing force by the biasing member does not act on the driven-side ratchet.

A further purpose of the present invention is to provide a sheet conveyance apparatus including a driving gear which rotates by receiving a driving force from a driving source, a driven gear which rotates by rotation of the driving gear, a toothed clutch which transmits the driving force from the driving source from the driving gear to the driven gear, the toothed clutch including a driving-side ratchet and a driven-side ratchet engageable with the driving-side ratchet and movable in an axial direction of the toothed clutch, a sheet conveyance roller which rotates in associated with the driven gear, wherein the driven gear is a helical gear, and the helical gear and the driven-side ratchet constitute one member, and wherein, when the driven-side ratchet rotates by receiving the driving force from the driving source in a forward rotation direction, the helical gear biases the driven-side ratchet toward the driving-side ratchet, and when the driven-side ratchet rotates by receiving a driving force from the sheet conveyance roller in a sheet conveyance direction, the helical gear biases the driven-side ratchet in a direction to which the driven-side ratchet is separated from the driving-side ratchet.

A further purpose of the present invention is to provide a driving force transmission apparatus including a driving gear which rotates by receiving a driving force from a driving source, a driven gear which rotates by rotation of the driving gear, a toothed clutch which transmits the driving force from the driving source from the driving gear to the driven gear, the toothed clutch including a driving-side ratchet movable between a first position and a second position in an axial direction of the toothed clutch and a driven-side ratchet engageable with the driving-side ratchet, the first position being a position in which the driving-side ratchet completely engages with the driven-side ratchet in the axial direction of the toothed clutch, the second position being a position in which a tip end of a pawl of the driving-side ratchet is located at a position which is the same as a tip end of a pawl of the driven-side ratchet in the axial direction of the toothed clutch, and an biasing member which biases the driving-side ratchet toward the driven-side ratchet, wherein, when the driving-side ratchet is located at the second position, an biasing force by the biasing member acts on the driving-side ratchet, or when the driving-side ratchet is located at the first position, the biasing force by the biasing member does not act on the driving-side ratchet.

A further purpose of the present invention is to provide a sheet conveyance apparatus including a driving gear which rotates by receiving a driving force from a driving source, a driven gear which rotates by rotation of the driving gear, a toothed clutch which transmits the driving force from the driving source from the driving gear to the driven gear, the toothed clutch including a driving-side ratchet movable between a first position and a second position in an axial direction of the toothed clutch and a driven-side ratchet engageable with the driving-side ratchet, the first position being a position in which the driving-side ratchet completely engages with the driven-side ratchet in the axial direction of the toothed clutch, the second position being a position in which a tip end of a pawl of the driving-side ratchet is located at a position which is the same as a tip end of a pawl of the driven-side ratchet in the axial direction of the toothed clutch, and a sheet conveyance roller which rotates in associated with the driven gear, an biasing member which biases the driving-side ratchet toward the driven-side ratchet, wherein, when the driving-side ratchet is located at the second position, an biasing force by the biasing member acts on the driving-side ratchet, or when the driving-side ratchet is located at the first position, the biasing force by the biasing member does not act on the driving-side ratchet.

A further purpose of the present invention is to provide a sheet conveyance apparatus including a driving gear which rotates by receiving a driving force from a driving source, a driven gear which rotates by rotation of the driving gear, a toothed clutch which transmits the driving force from the driving source from the driving gear to the driven gear, the toothed clutch including a driving-side ratchet movable in an axial direction of the toothed clutch and a driven-side ratchet engageable with the driving-side ratchet, a sheet conveyance roller which rotates in associated with the driven gear, wherein the driving gear is a helical gear, and the helical gear and the driving-side ratchet constitute one member, and wherein, when the driving-side ratchet rotates by receiving the driving force from the driving source in a forward rotation direction, the helical gear biases the driving-side ratchet toward the driven-side ratchet, and when the driving-side ratchet rotates by receiving a driving force from the sheet conveyance roller in a sheet conveyance direction, the helical gear biases the driving-side ratchet in a direction to which the driving-side ratchet is separated from the driven-side ratchet.

A still further purpose of the present invention will become apparent from the following description of exemplary embodiments with reference to the attached drawings.

DESCRIPTION OF THE EMBODIMENTS

The best modes for carrying out this invention will now be described in detail while referring to the accompanying drawings. However, the sizes, materials, shapes and positions of components described in these embodiments should be appropriately changed in accordance with the arrangement of an apparatus for which the invention is applied, or for various conditions, and are not represented in order to limit the scope of the invention to the following embodiments.

First Embodiment

An image forming apparatus wherein a driving force transmission apparatus according to this invention is mounted will now be described.

Figure 1:
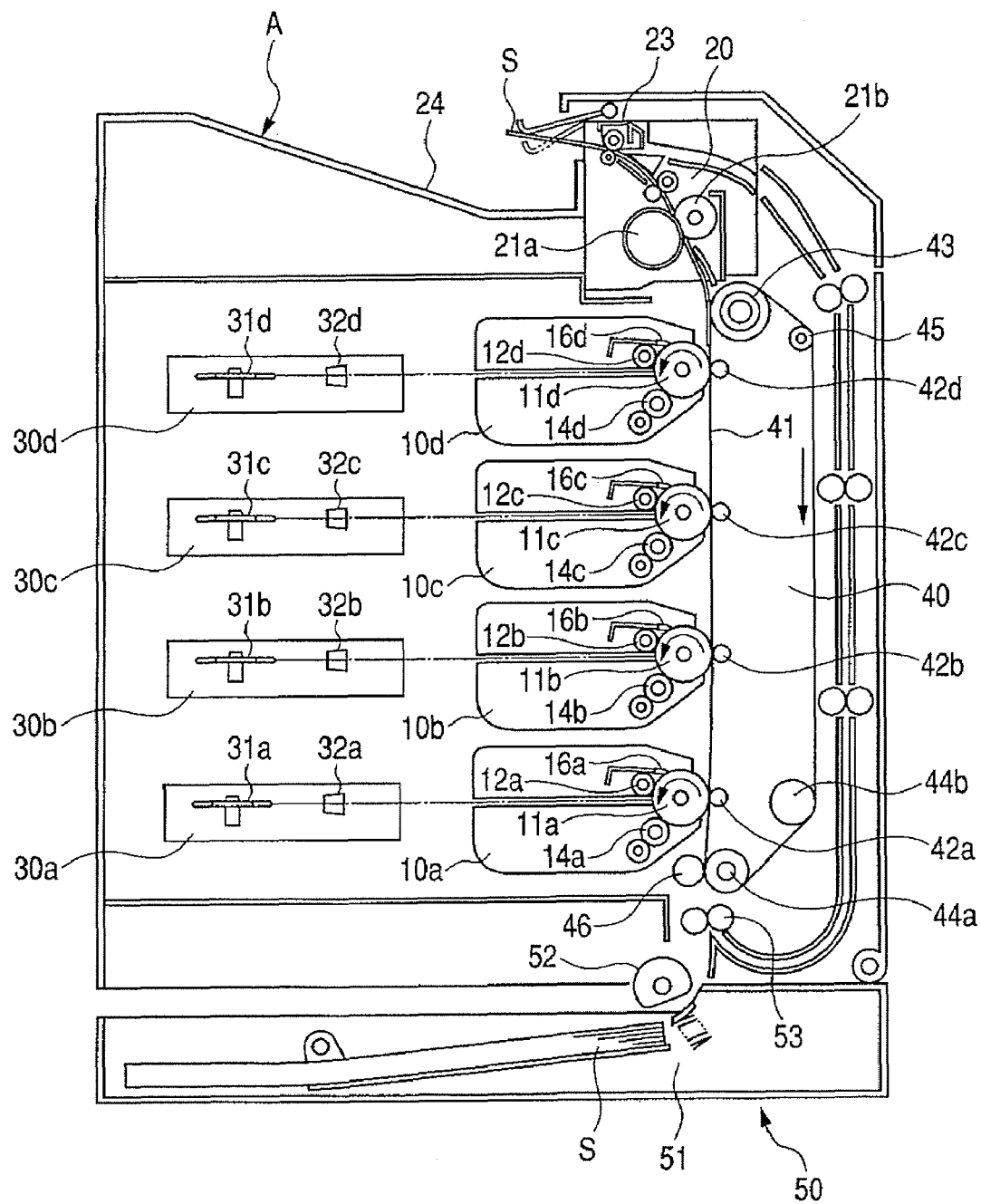
FIG. 1 is a schematic cross-sectional view of an image forming apparatus in which a driving force transmission apparatus is mounted.

First, the general configuration of an image forming apparatus will be explained while referring to FIG. 1. FIG. 1 is a schematic cross-sectional view of the general configuration of a full color laser beam printer A that is one mode for an image forming apparatus.

The color image forming apparatus A shown in FIG. 1 includes four photosensitive drums 11 (11a, 11b, 11c and 11d), vertically arranged. The photosensitive drums 11, in FIG. 1, are rotated counterclockwise by driving means (not shown). Provided sequentially, in the rotational direction, around the photosensitive drums 11 are, for example, charging devices 12 (12a, 12b, 12c and 12d), scanner units 30 (30a, 30b, 30c and 30d), developing apparatuses 14 (14a, 14b, 14c and 14d), an electrostatic transfer device 40 and cleaning devices 16 (16a, 16b, 16c and 16d).

The charging devices 12 uniformly charge the surfaces of the photosensitive drums 11. The scanner units 30 emit a laser beam, based on image information, and form electrostatic latent images on the photosensitive drums 11. The developing apparatuses 14 attach toner to the electrostatic latent images and develop toner images. The electrostatic transfer device 40 transfers the toner images on the photosensitive drums 11 to a recording material S, such as a recording medium, a transfer material or a sheet. And the cleaning devices 16 remove toner remaining on the surfaces of the photosensitive drums 11 after the toner images have been transferred.

The photosensitive drums 11, the charging devices 12, the developing apparatuses 14 and the cleaning devices 16 are integrally formed as cartridges to constitute process cartridges 10.

A detailed explanation will now be given, beginning with the photosensitive drums 11.

The photosensitive drums 11 are formed by applying an organic photoconductive layer (OPC photosensitive member) to the outer surface of an aluminum cylinder having a diameter, for example, of 30 mm. Each photosensitive drum 11 is rotatably supported at each of their two ends by a support member, and is rotated counterclockwise when the driving force of a driving motor (not shown) is received at one end.

A contact charging type can be employed for the charging devices 12. Charging members are conductive rollers, and when the conductive rollers are brought into contact with the surfaces of the photosensitive drums 11, and a charge bias voltage is applied to the conductive rollers, the surfaces of the photosensitive drums 11 can be uniformly electrified.

The scanner units 30 are arranged substantially horizontal to the photosensitive drums 11, and in consonance with an image signal, a laser diode emits image light onto polygon mirrors 31 (31a, 31b, 31c and 31d) that are rotated rapidly by scanner motors. The image light reflected by the polygon mirrors 31 selectively exposes the surfaces of the electrified photosensitive drums 11, through imaging lenses 32 (32a, 32b, 32c and 32d), so that electrostatic latent images are formed.

The developing apparatuses 14a, 14b, 14c and 14d include developing devices that respectively contain yellow, magenta, cyan and black toners.

An electrostatic transfer belt 41 that moves cyclically is located opposite, and in contact with, the photosensitive drums 11a, 11b, 11c and 11d. The electrostatic transfer belt 41 is formed of a film member about 150 μm thick that has a volume resistivity of $10^{11}$ to $10^{14}$ Ω·cm. This electrostatic transfer belt 41 is supported vertically by rollers on four shafts, and is moved cyclically so as to electrostatically attract a sheet S to the left outer face in FIG. 1 and to bring the sheet S into contact with the photosensitive drums 11. As a result, the sheet S is conveyed to transferring positions by the electrostatic transfer belt 41, and the toner images on the photosensitive drums 11 are transferred to the sheet S.

Transfer rollers 42 (42a, 42b, 42c and 42d) are arranged so that they contact the inner surface of the electrostatic transfer belt 41 at locations opposite the four photosensitive drums 11a, 11b, 11c and 11d. Positive charges are applied by these transfer rollers 42 to the sheet S, through the electrostatic transfer belt 41, and by employing the thus provided electric fields, toner images, which have negative polarity, are individually transferred from the photosensitive drums 11 to the sheet S, which is currently held so as to contact the pertinent photosensitive drums 11.

The electrostatic transfer belt 41, which has a circumferential length of about 700 mm and a thickness of 150 μm, is stretched around four rollers, i.e., a driving roller 43, driven rollers 44a and 44b and a tension roller 45, and is rotated in a direction indicated by an arrow is FIG. 1. Then, the sheet S is conveyed from the driven roller 44a side to the driving roller 43 side by the electrostatic transfer belt 41, and during this period, the transfer of toner images is performed.

A sheet feeding unit 50 is used to feed a sheet S to an image forming unit, and a plurality of sheets S are stored in a sheet feeding cassette 51. In accordance with the image forming operation, a sheet feeding roller (a half-circle roller) 52 and a registration roller pair 53 are rotated and feed each sheet S in the sheet feeding cassette 51. Sequentially, the leading edge of a sheet S is temporarily halted at the registration roller pair 53 and a loop is formed. Thereafter, the rotation of the electrostatic transfer belt 41 and an image writing position are synchronized, and then, the sheet S is fed to the electrostatic transfer belt 41 by the registration roller pair 53.

A fixing apparatus 20 is used to fix multiple color toner images transferred to the sheet S, and includes: a fixing roller pair 21, which is a rotary heat roller 21*a* and a pressure roller 21*b* that presses the sheet S against the heat roller 21*a* so that the sheet S is heated under pressure.

Specifically, when a sheet S to which toner images have been transferred from the photosensitive drums 11 is passed through the fixing apparatus 20, the sheet is heated, under pressure, by the fixing roller pair 21, while being conveyed by the fixing roller pair 21. In this manner, multiple color toner images are fixed to the surface of the sheet S.

The image forming operation of the image forming apparatus will now be described.

During the image forming operation, the process cartridges 10*a*, 10*b*, 10*c* and 10*d* are sequentially driven at corresponding printing timings, and the photosensitive drums 11*a*, 11*b*, 11*c* and 11*d* are interactively rotated counterclockwise. Then, the scanner units 30*a*, 30*b*, 30*c* and 30*d*, corresponding to the process cartridges 10*a*, 10*b*, 10*c* and 10*d*, are sequentially driven. As these components are driven, the charging devices 12 apply uniform charges to the circumferential surfaces of the photosensitive drums 11, and in accordance with image signals, the scanner units 30 expose the circumferential surfaces of the photosensitive drums 11 to form electrostatic latent images on these surfaces. Developing rollers provided inside the developing apparatuses 14 transfer toner to the low potential portions of the electrostatic latent images, and form (develop) toner images on the circumferential surfaces of the photosensitive drums 11.

The registration roller pair 53 begins rotating and feeds a sheet S to the electrostatic transfer belt 41, so that, at a timing whereat the leading edge of the toner image formed on the circumferential surface of the photosensitive drum 11 for the uppermost stream is conveyed to a point opposite the electrostatic transfer belt 41, the printing start position for the sheet S matches the opposite point.

The sheet S is sandwiched between an electrostatic attraction roller 46 and the electrostatic transfer belt 41 and is pressed against the outer surface of the electrostatic transfer belt 41, and a voltage is applied between the electrostatic transfer belt 41 and the electrostatic attraction roller 46. With this arrangement, charges are induced between the sheet S, which is a dielectric material, and the dielectric layer of the electrostatic transfer belt 41, so as to electrostatically attract the sheet S to the outer surface of the electrostatic transfer belt 41. Therefore, the sheet S is stably attracted to the electrostatic transfer belt 41 and is conveyed to the transferring portion lowermost stream.

While the sheet S is being conveyed, toner images on the individual photosensitive drums 11 are sequentially transferred to the sheet S by the electric fields formed between these photosensitive drums 11 and the transfer rollers 42.

The sheet S, bearing four color toner images, is separated from the electrostatic transfer belt 41 in consonance with the curvature of a belt drive roller 43, and is guided to the fixing apparatus 20. The sheet S, which is guided to the fixing apparatus 20, is conveyed and heated, under pressure, by the fixing roller pair 21. Through this process, multiple color toners can be fixed to the surface of the sheet S. Then, after the toner images have been fixed to the surface of the sheet S by the fixing apparatus 20, the sheet S is externally discharged, image side down, to a delivery portion 24 by a delivery roller pair 23.

The driving force transmission apparatus of this embodiment will now be described.

Figure 2:
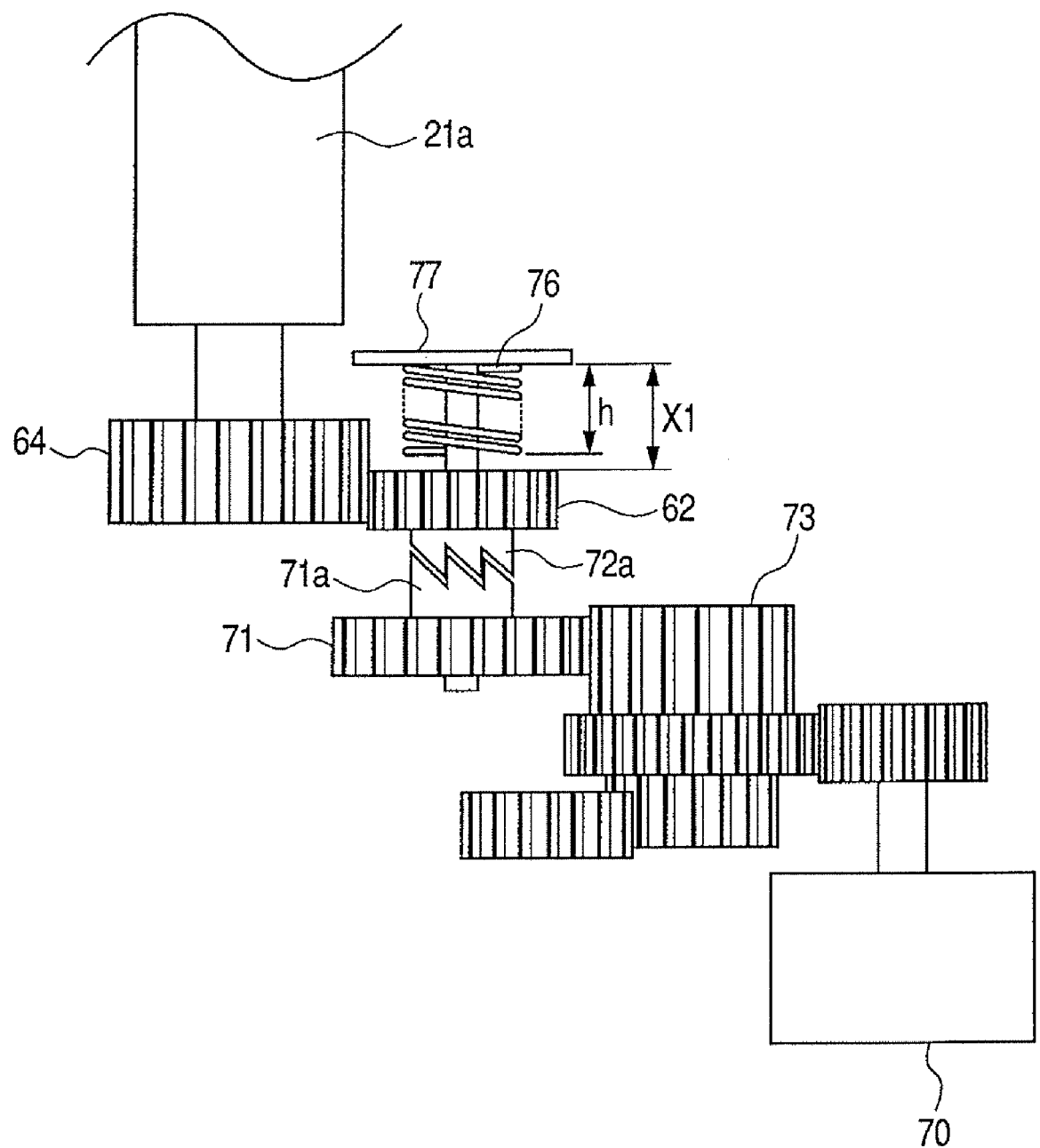
FIG. 2 is a diagram showing a configuration wherein a driving force transmission apparatus according to a first embodiment of the invention is applied for a fixing apparatus.
Figure 3:
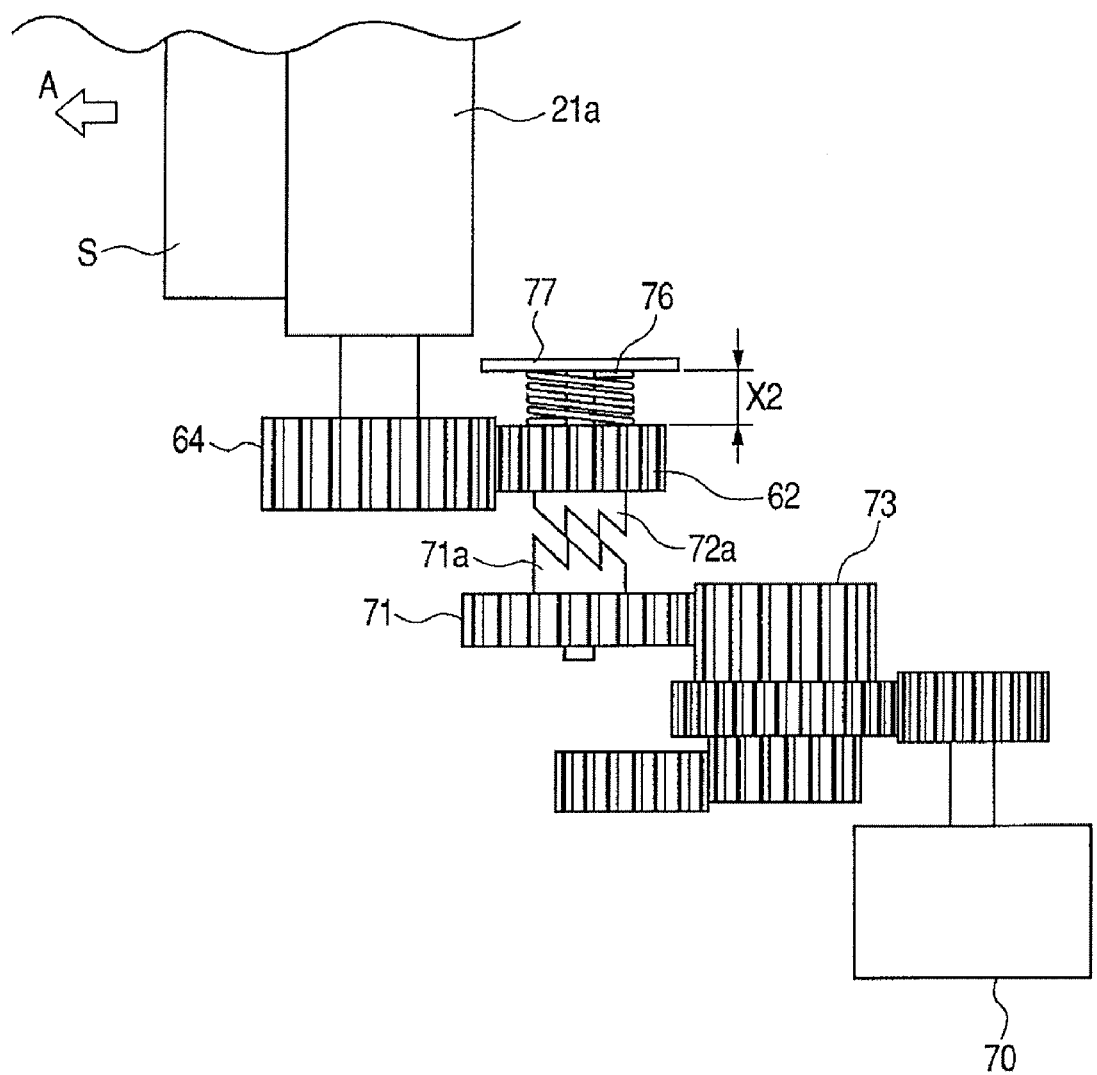
FIG. 3 is a diagram showing a configuration wherein the toothed clutch of the driving force transmission apparatus of the first embodiment is in a driving force transmission blocked state.

FIG. 2 is a diagram showing a configuration for a case wherein the driving force transmission apparatus of this embodiment is applied for a fixing apparatus that is one type of sheet conveyance apparatus. FIG. 3 is a diagram showing a configuration for a case wherein the toothed clutch of the driving force transmission apparatus shown in FIG. 2 is in the driving force transmission blocked state.

The fixing apparatus includes a fixing roller pair 21 for conveying a sheet bearing unfixed toner images. The fixing roller pair 21 includes the heat roller (sheet conveyance roller) 21*a*, and the pressure roller 21*b*, which forms a fixing nip portion for conveying the sheet S with the heat roller 21*a*. The heat roller 21*a* is rotated upon receiving a drive force from a driving motor 70, which serves as a driving source, and the pressure roller 21*b* is rotated by friction in consonance with the rotation of the heat roller 21*a*. A heater (not shown) is provided inside the heat roller 21*a*, and heats the sheet at the nip portion so as to thermally fix unfixed toner images on the sheet.

The driving force from the driving motor 70 is transmitted to the heat roller 21*a* via an intermediate gear 73, which is rotated upon receiving the driving force from the diving motor 70, a driving gear 71, which engages the intermediate gear 73, a toothed clutch, a driven gear 62 and a roller gear 64, which is fitted over the shaft of the heat roller 21*a*.

The toothed clutch includes a driving-side ratchet 71*a* and a driven-side ratchet 72*a*, which can move in the axial direction of the toothed clutch. In this embodiment, the driving gear 71 and the driving-side ratchet 71*a* constitute one member, and the driven gear 62 and the driven-side ratchet 72*a* also constitute one member.

The driven gear 62 is biased toward the driving gear 71 by a compression spring 76, which is a biasing member. The movement of the compression spring 76 is regulated by a regulation member 77.

During the fixing process for thermally fixing unfixed toner images to the sheet, the driving motor 70 is rotated forward, and this driving force is transmitted to the heat roller 21*a*, which is then rotated in the sheet conveyance direction. At this time, the pawls (teeth) of the driving-side ratchet 71*a* and the driven-side ratchet 72*a* are engaged, and the toothed clutch enters the driving force transmission state (see FIG. 2).

On the other hand, when a sheet S jam has occurred in the image forming apparatus, and when the image forming apparatus is halted with the sheet caught in the fixing nip portion, the user must remove the sheet S from the fixing nip portion, i.e., must manually clear the jam. In this embodiment, as shown in FIG. 3, the apparatus is so designed that the sheet S is pulled out in the same direction as a delivery direction A during the fixing process. As the jam is being cleared, the fixing roller pair 21 is rotated in the sheet conveyance direction by the friction between the sheet S and the fixing roller pair 21. However, since the pawl (tooth) of the driven-side ratchet 72*a* slides over the pawl (tooth) of the driving-side ratchet 71*a*, neither the driving gear 71 nor the driving motor 70 is rotated. Therefore, when the user pulls the sheet S out, only a comparatively small load is imposed on the sheet S.

As described above, the driven-side ratchet 72*a* of this embodiment moves in the axial direction of the toothed clutch. When the driven-side ratchet 72*a* has fully engaged the driving-side ratchet 71*a* in the axial direction of the toothed clutch, i.e., when the driven-side ratchet 72a has entered most deeply into the pawl of the driving-side ratchet 71a, the biasing force provided by the compression spring 76 does not act on the driven-side ratchet 72a.

More specifically, assume that under a condition wherein the driving-side ratchet 72a has fully engaged the driving-side ratchet 71a, i.e., the pawl of the driven-side ratchet 72a has entered most deeply into the pawl of the driving-side ratchet 71a, the position of the driven-side ratchet 72a at this time is defined as a first position, and the distance between the driven gear 62 and the regulation member 77 is defined as x1 (see FIG. 2). Further, assume that, under a condition wherein the tip end of the pawl of the driven-side ratchet 72a is near the same position, in the axial direction of the toothed clutch, as the tip end of the pawl of the driving-side ratchet 71a, i.e., when the driven-side ratchet 72a is disengaged from the driving-side ratchet 71a, the position of the driven-side ratchet 72a is defined as a second position, and the distance between the driven gear 62 and the regulation member 77 is defined as x2 (see FIG. 3). Furthermore, when the natural length of the compression spring 76 is defined as h, the apparatus is designed so that a relationship of x1>h>x2 is established.

Therefore, when the driven-side ratchet 72a has fully engaged the driving-side ratchet 71a, i.e., when the pawl of the driven-side ratchet 72a has entered most deeply into the pawl of the driving-side ratchet 71a, the biasing force exerted by the compression spring 76 does not act on the driven-side ratchet 72a. Under these circumstances, when the heat roller 21a is rotated as the user pulls the sheet S from the fixing nip portion, a phenomenon can be avoided according to which the ratchet pawls forcefully strike each other each time the pawl of the driven-side ratchet 72 slides over the pawl of the driving-side ratchet 71a. Thus, the frequent occurrence of impulsive sound can be suppressed, and noise that may annoy the user while clearing the jam can be prevented.

Second Embodiment

A driving force transmission apparatus according to a second embodiment of the present invention will now be described.

Figure 4:
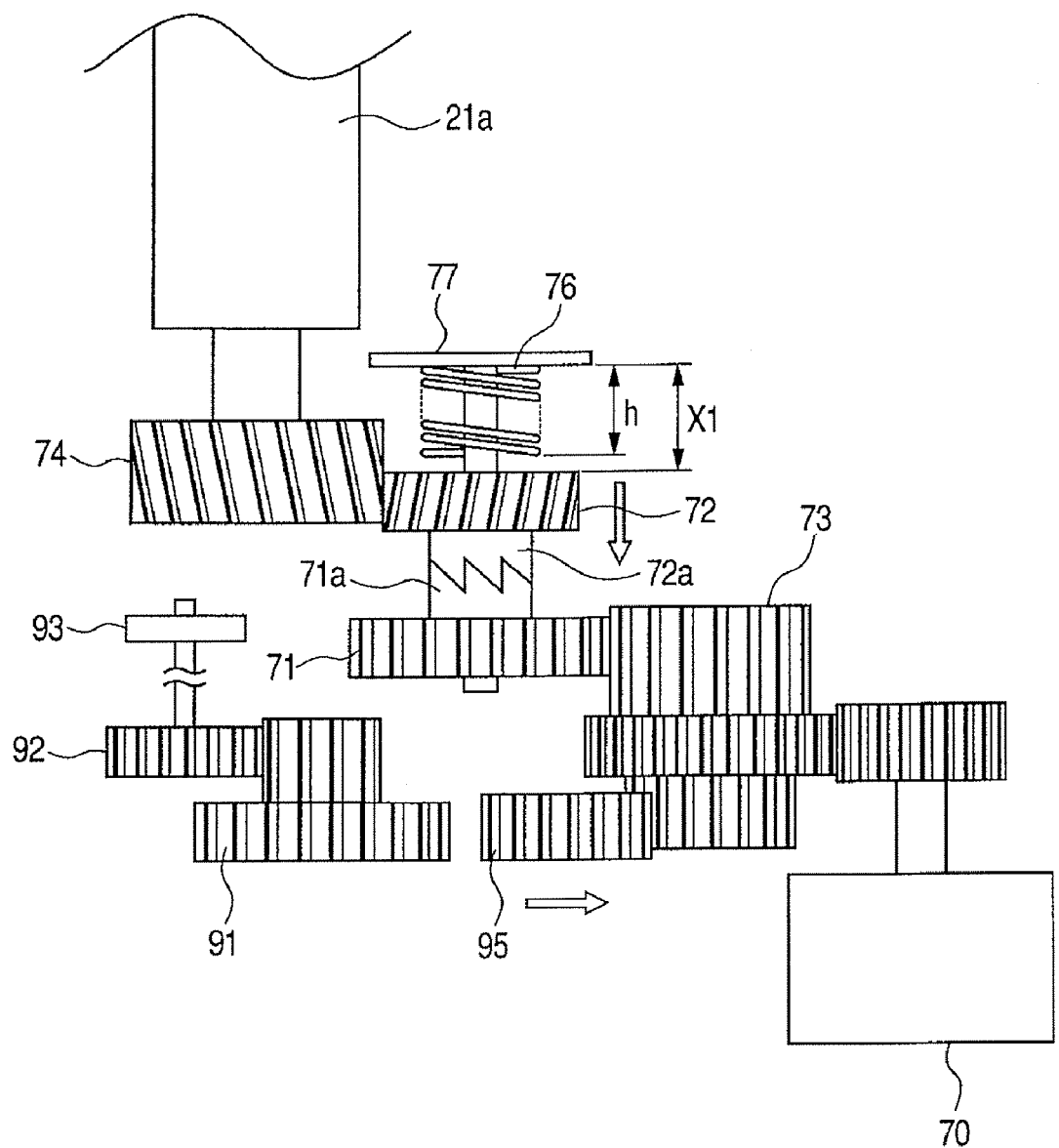
FIG. 4 is a diagram showing a driving force transmission apparatus according to a second embodiment of the present invention.
Figure 5:
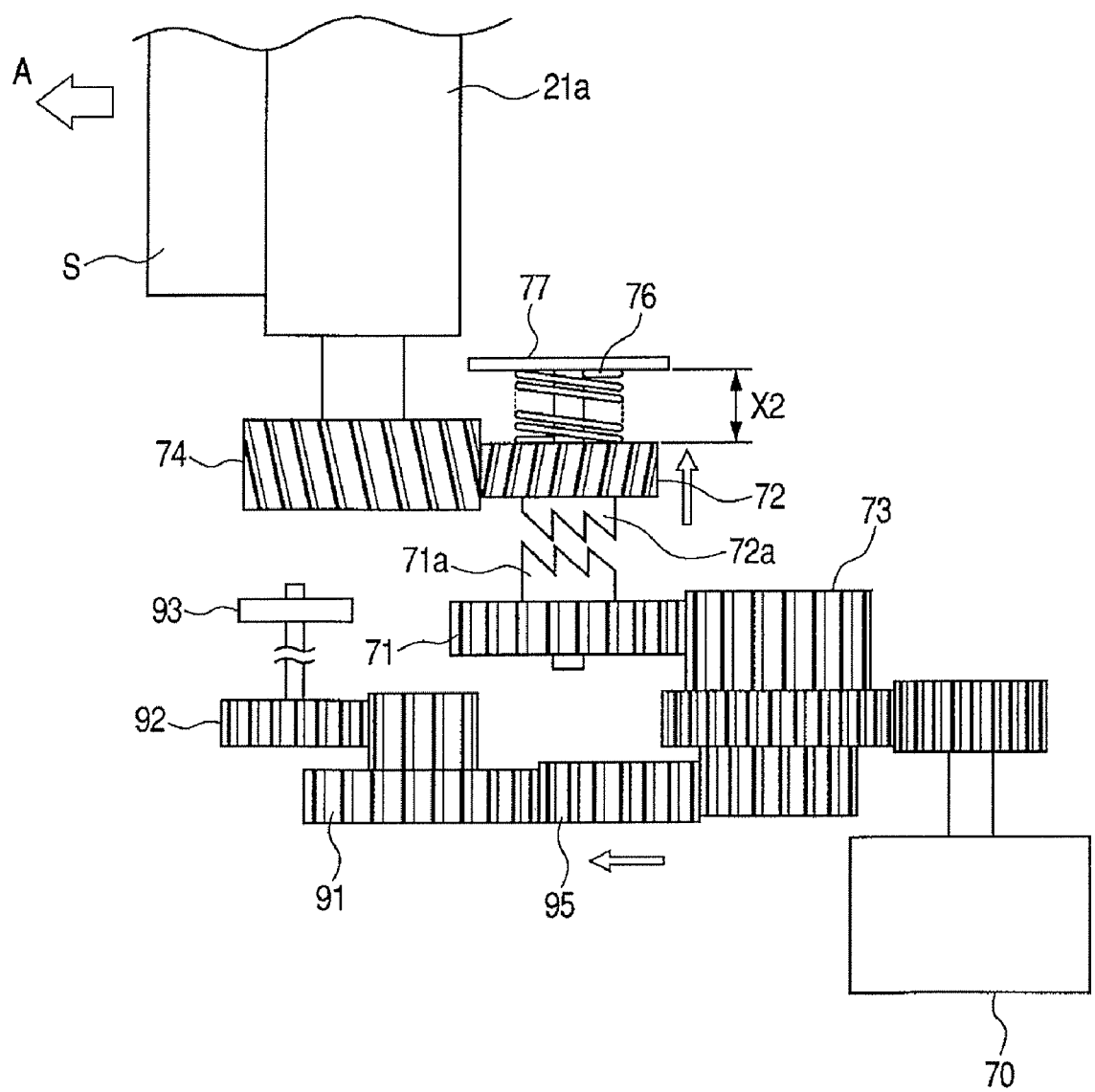
FIG. 5 is a diagram showing a configuration wherein the toothed clutch of the driving force transmission apparatus of the second embodiment is in a driving force transmission blocked state.

FIG. 4 is a diagram showing the configuration of the driving force transmission apparatus of the second embodiment. And FIG. 5 is a diagram showing the configuration in a case wherein the toothed clutch of the driving force transmission apparatus of the second embodiment is in a driving force transmission blocked state.

As shown in FIG. 4, a driving gear 71 and a driven gear 72 are located coaxially between an intermediate gear 73 and a roller gear 74. The driven gear 72 is movable in the axial direction of the toothed clutch, and engages the roller gear 74.

When the intermediate gear 73 and the driving gear 71 are rotated in the forward direction by a driving motor 70, the pawls of a driving-side ratchet 71a and a driven-side ratchet 72a are engaged, and the toothed clutch enters the driving force transmission state (see FIG. 4). Then, the driving force is transmitted from the driving motor 70 via the toothed clutch to the driven gear 72, and the roller gear 74 and a fixing roller pair 21 are rotated in the sheet conveyance direction.

On the other hand, when a sheet jam has occurred, the driving motor 70 is rotated in reverse, in the direction opposite to that in which a sheet is conveyed, so that a pressure exerted on a fixing nip portion is automatically released. More specifically, a rocking gear is employed as a pressure release driving gear 95 that engages the intermediate gear 73, so as to transmit a driving force, in only one direction, to a pressure release reduction gear 91 at the succeeding stage. As shown in FIG. 5, when the driving motor 70 is reversely driven while pressure is released at the fixing roller pair 21, the pressure release driving gear 95 engages the pressure release reduction gear 91 and transmits the driving force. Then, a cam gear 92 at the final stage and a coaxially located cam 93 are rotated and separate the fixing roller pair 21 to release the pressure exerted at the fixing nip portion. According to this arrangement, since the pressure exerted at the fixing nip portion is released, a user can easily clear the jam.

Further, in this case, the driven-side ratchet 72a is impelled and disengaged, by the driving-side ratchet 71a, and is moved, against the biasing force by the compression spring 76, away from the driving-side ratchet 71a. At this time, the transmission of the driving force is blocked.

In this embodiment, assume that, under a condition wherein the driven-side ratchet 72a has fully engaged the driving-side ratchet 71a, i.e., the pawl of the driven-side ratchet 72a has entered most deeply the pawl of the driving-side ratchet 71a, the position of the driven-side ratchet 72a is defined as a first position, and the distance between the driven gear 72 and a regulation member 77 is defined as x1 (see FIG. 4). On the other hand, assume that under a condition wherein the tip end of the pawl of the driven-side ratchet 72a is near the same position in the axial direction of the toothed clutch as the tip end of the pawl of the driving-side ratchet 71a, i.e., when the driven-side ratchet 72a is disengaged from the driving-side ratchet 71a, the position of the driving-side ratchet 72a is defined as a second position, and the distance between the driven gear 72 and the regulation member 77 is defined as x2 (see FIG. 5). Furthermore, when the natural length of the compression spring 76 is defined as h, the apparatus is designed so that a relationship of x1>h>x2 is established. That is, the natural length of the compression spring 76 that biases the driven gear 72 is designated so that the ratchet pawl will not be impelled to its end position by the biasing force exerted by the compression spring 76. With this arrangement, the driven-side ratchet 72a will not be impelled to the location of the end of the driving-side ratchet 71a. Therefore, an impulsive sound (an action sound) produced by the driving-side ratchet 71a striking the driven-side ratchet 72a can be suppressed.

As shown in FIG. 4, helical gears are appropriate for the driven gear 72 and the roller gear 74. For these helical gears, a torsion angle is designated so that when the driving motor 70 is rotated forward (to transmit the driving force in the sheet conveyance direction A), a thrust force can be generated that biases the driven gear 72 toward the driving gear 71. With this arrangement, when the forward rotation of the driving motor 70 is resumed, the driven-side ratchet 72a is gradually impelled into the driving-side ratchet 71a by the thrust produced by the helical gears. As a result, the ratchets 71a and 72a are fully engaged, and the driving force can be stably transmitted. That is, when the driven-side ratchet 72 begins to rotate upon receiving from the driving source 70 the driving force in the sheet conveyance direction A, the driving-side ratchet 72a is biased toward the driving-side ratchet 71a by the thrust produced by the helical driven gear 72. In this case, since the driven-side ratchet 72a is gradually impelled inward, into the driving-side ratchet 71a, by the helical gear, an impulsive sound produced by the driven-side ratchet 72a forcefully striking the driving-side ratchet 71a can be suppressed. However, there is a case wherein the pressure release mechanism does not work when, for example, the power of the image forming apparatus is turned off during image forming processing. Therefore, for a fixing apparatus that includes the pressure release mechanism, there is a possibility that a user will have to pull out a sheet S that is held in the fixing nip portion.

An explanation will be given for a case wherein, for an apparatus in the halted state, a sheet S sandwiched by the fixing roller pair is to be pulled out in the direction indicated by the arrow in FIG. 5. In this case, the roller gear 74 and the driven gear 72 will be rapidly rotated forward. When the driven gear 72 is rotated rapidly, the pawl of the driven-side ratchet 72a slides over the pawl of the driving-side ratchet 71a, in the same manner as described above, and the driven-side ratchet 72a is moved, against the biasing force exerted by the compression sprig 76, away from the driving-side ratchet 71a. Thus, the driven-side ratchet 72a is disengaged from the driving-side ratchet 71a and is idle. Further, since the driven-side ratchet 72a is also biased away from the driving-side ratchet 71a by the helical gears, the driven-side ratchet 72a and the driving-side ratchet 71a are fully disengaged.

In this case, the driven-side ratchet 72a is not impelled to the end of the driving-side ratchet 71a, and the impulsive sound (action sound) generated by the driving-side ratchet 71a forcefully striking the driven-side ratchet 72a can be suppressed.

In this embodiment, an explanation has been given for the case wherein the driving force transmission apparatus is applied for a fixing apparatus. However, the present invention is not limited to this, and the driving force transmission apparatus can also be appropriately applied for the conveying of sheets by a sheet conveyance apparatus. In this case, a sheet conveyance roller pair corresponds to the fixing roller pair described above, and when the driving motor 70 is rotated in reverse, the conveying roller pair need only be separated and release the pressure applied to hold a sheet, so that the clearing of a jam can be easily performed.

As described above, according to this embodiment, when the driving motor 70 is rotated in reverse, or when a user is to remove a jammed sheet, the driven-side ratchet 72a biased by the compression spring 76 is not impelled to the end of the driving-side ratchet 71a because the natural length of the compression spring 76 is too short. Therefore, it is possible to suppress an impulsive sound (an action sound) that is generated when the driven-side ratchet 72a forcefully strikes the driving-side ratchet 71a in the axial direction of the toothed clutch. Furthermore, when the driving motor 70 is rotated forward, the driven-side ratchet 72a is gradually impelled to the end of the driving-side ratchet 71a by the force of the thrust produced by the helical gear. Thus, the impulsive sound produced by the striking of the ratchet pawls can be suppressed, and the ensured transmission of the driving force is assured.

Third Embodiment

A third embodiment of the present invention will now be described. In the arrangement of the second embodiment, a helical gear is employed for the driven gear 72, and the force of the thrust generated for the driven gear 72 to obtain complete engagement of the ratchets. In this embodiment, the shapes of ratchet pawls are designed to obtain the same effects. In the third embodiment, primarily, only a feature that differs from the second embodiment will be explained. Further, the same reference numerals are provided for the same components as in the second embodiment, and no further explanation for them will be given.

Figure 6:
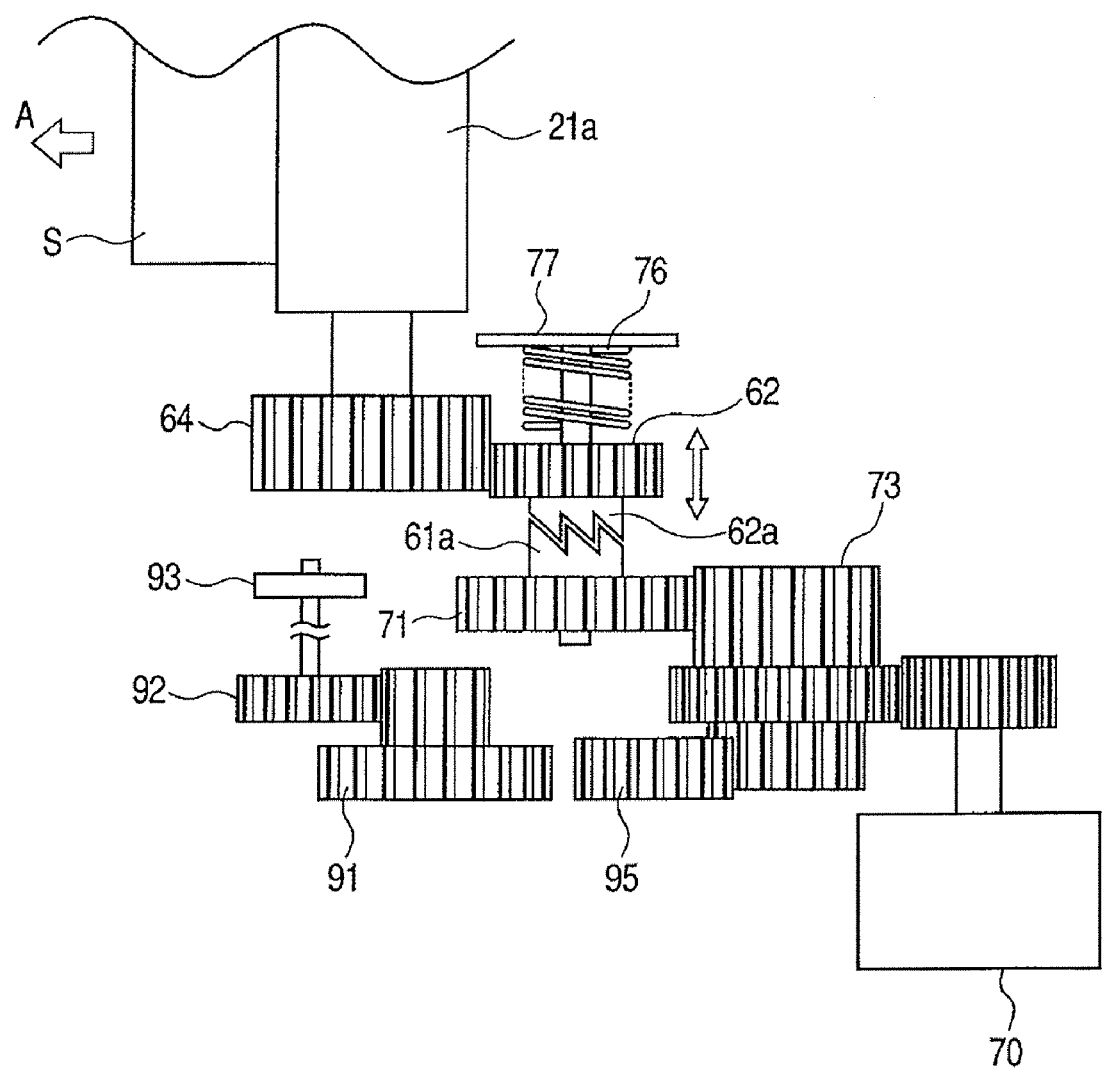
FIG. 6 is a diagram showing a configuration for a driving force transmission apparatus according to a third embodiment of the present invention.

FIG. 6 is a diagram showing the configuration of a driving force transmission apparatus according to the third embodiment. Ratchets 61a and 62a have acute angle pawl shapes, for which a torsion angle is designated, in order to generate a thrust force that moves a driven gear 62 toward a driving gear 71. With this arrangement, when a driving motor 70 rotates forward, the ratchets 61a and 62a are steadily engaged, as well as when a helical gear is employed for the driven gear 62. That is, when the driven-side ratchet 62a is rotated upon receiving from a driving source the driving force in a forward rotation direction (a sheet conveyance direction), the driven-side ratchet 62a is biased toward the driving-side ratchet 61a by the shapes of the pawls for which the torsion angle is designated.

As described above, when the driving motor 70 rotates forward, the driven-side ratchet 62a is gradually impelled to the end of the driving-side ratchet 61a by the torsion angles of the ratchet pawls. Therefore, impulsive sound produced by the ratchets striking can be suppressed, and the driving force can be more steadily transmitted.

In addition to the ratchets 61a and 62a having this pawl shape, a helical gear may be employed for the driven gear 62.

Fourth Embodiment

A fourth embodiment of the present invention will now be described. For the second embodiment, the compression spring 76 is employed as a biasing member, whereas in this embodiment, a flat spring 78 is employed as a biasing member. In this embodiment, primarily, only a feature that differs from the second embodiment will be explained. Further, the same reference numerals are provided for the same components as in the second embodiment, and no further explanation for them will be given.

Figure 7:
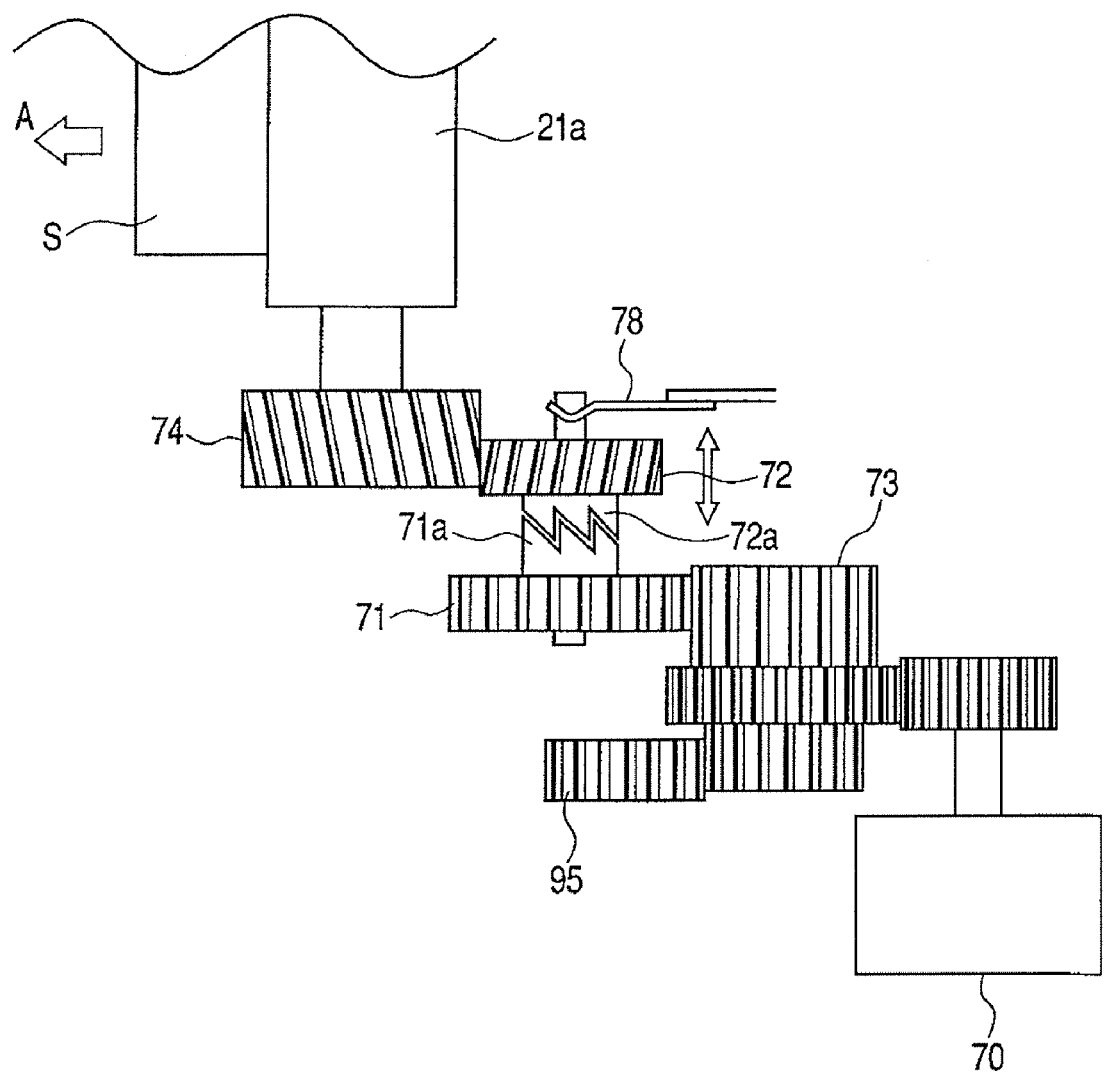
FIG. 7 is a diagram showing a driving force transmission apparatus according to a fourth embodiment of the present invention.

FIG. 7 is a diagram showing the configuration, as an example driving force transmission apparatus for the fourth embodiment, of a driving force transmission mechanism that drives a fixed roller pair.

As shown in FIG. 7, a driving gear 71 and a driven gear 72 are provided coaxially between an intermediate gear 73 and a roller gear 74. The driven gear 72 is movable in the axial direction of a toothed clutch, and engages the roller gear 74.

As shown in FIG. 7, when the intermediate gear 73 and the driving gear 71 are rotated in the forward direction (the sheet conveyance direction) by the driving force by a driving motor 70, the biasing force exerted by the flat spring 78 is applied to impel the driven gear 72 toward the driving gear 71, and the ratchets 71a and 72a engage and are coupled. Then, the driven gear 72 and the driving gear 71 are rotated together, and accordingly, the roller gear 74, which engages the driven gear 72, and a heat roller 21a are rotated in the same direction.

In a case wherein the pawls of the driven-side ratchet 72a and the driving-side ratchet 71a are fully engaged, i.e., at the position (the first position) of the driven-side ratchet 72a, the biasing force exerted by the flat sprint 78 is not applied to impel the driven-side ratchet 72a toward the driving-side ratchet 71a. In a case wherein the pawl of the driven-side ratchet 72a is disengaged from the pawl of the driving-side ratchet 71a, i.e., at the position (the second position) of the driven-side ratchet 72a, the biasing force exerted by the flat spring 78 is applied to impel the driven-side ratchet 72a toward the driving-side ratchet 71a.

Therefore, as well as in the second embodiment, the driven-side ratchet 72a is not rapidly impelled to the end of the driving-side ratchet 71a, and an impulsive sound (an action sound), generated by the driven-side ratchet 72a striking the driving-side ratchet 71a, can be suppressed. Furthermore, since a space equivalent to the length of a spring is saved, compared with when a compression spring is employed, downsizing of the apparatus is possible.

Fifth Embodiment

A fifth embodiment of the present invention will now be explained. In the first embodiment, the biasing force by the compression spring 76 is applied to the driven gear 62 and the driven-side ratchet 72a. According to the arrangement for this embodiment, the biasing force exerted by a compression spring 86 is applied to a driving gear 81 and a driving-side ratchet 81a. In this embodiment, primarily, only a feature that differs from those in the first embodiment will be explained. Further, the same reference numerals are provided for the same components as in the first embodiment, and no further explanation for them will be given.

Figure 8:
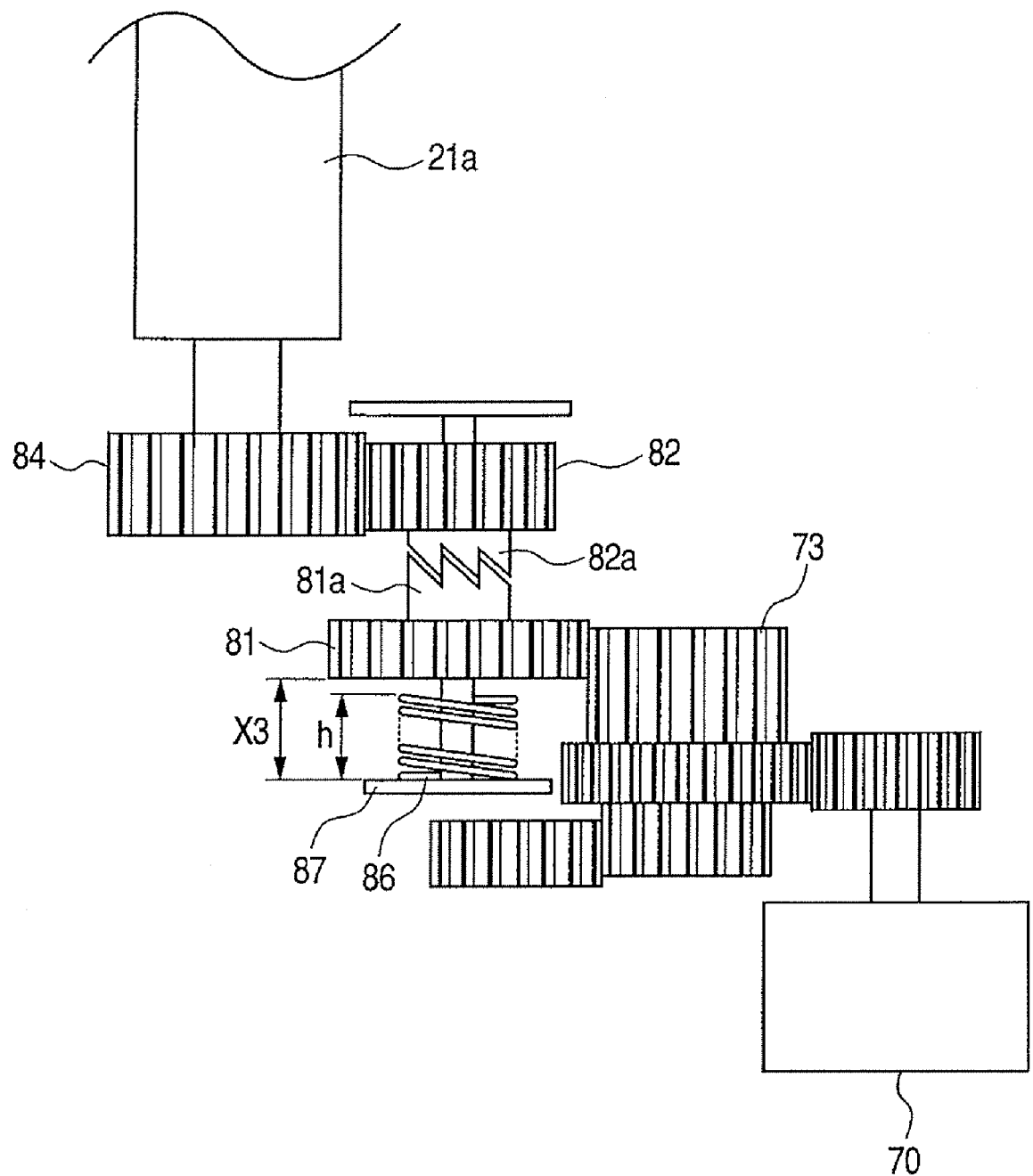
FIG. 8 is a diagram showing a driving force transmission apparatus according to a fifth embodiment of the present invention.
Figure 9:
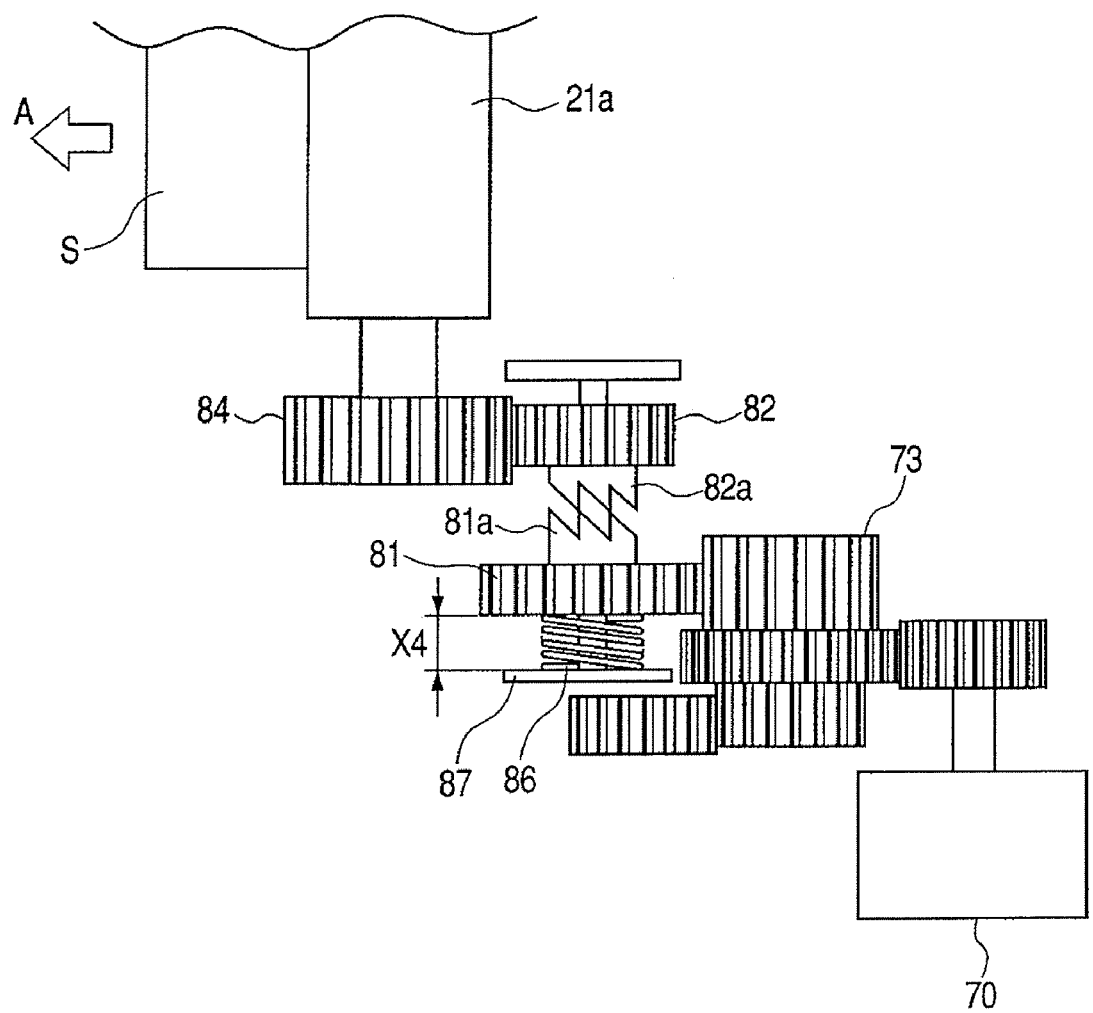
FIG. 9 is a diagram showing a configuration wherein the toothed clutch of the driving force transmission apparatus of the fifth embodiment is in a driving force transmission blocked state.

FIG. 8 is a diagram showing a configuration for a case wherein the driving force transmission apparatus of this embodiment is applied for a fixing apparatus, which is one type of sheet conveyance apparatus. And FIG. 9 is a diagram showing a configuration for a state wherein the toothed clutch of the driving force transmission apparatus in FIG. 8 is in the driving force transmission blocked state.

The driving force by a driving motor 70 is transmitted to a heat roller 21a via an intermediate gear 73, which is to be rotated upon receiving the driving force by the driving motor 70, a driving gear 81, which engages the intermediate gear 73, a toothed clutch, a driven gear 82 and a roller gear 84 that is fitted over the shaft of the heat roller 21a.

The toothed clutch includes a driving-side ratchet 81a, which is movable in the axial direction of the toothed clutch, and a driven-side ratchet 82a. In this embodiment, the driving gear 81 and the driving-side ratchet 81a constitute one member, and the driven gear 82 and the driven-side ratchet 82a constitute one member.

The driving gear 81 is biased toward the driven gear 82 by the compression spring 86, which is a biasing member. The movement of the compression spring 86 is regulated by a regulation member 87.

During a fixing process for thermally fixing unfixed toner images to a sheet, the driving motor 70 is rotated forward, and this driving force is transmitted to the heat roller 21a, which is then rotated in the sheet conveyance direction. At this time, the pawls of the driving-side ratchet 81a and the driven-side ratchet 82a are engaged, and the toothed clutch enters the driving force transmission state (see FIG. 8).

On the other hand, when a sheet S jam has occurred in the image forming apparatus, and when the image forming apparatus is halted with the sheet S held in the fixing nip portion, a user must pull the sheet S out of the fixing nip portion, i.e., must clear the jam. In this embodiment, as shown in FIG. 9, the apparatus is so designed that the sheet is to be pulled out in the same direction as the delivery direction A in the fixing process. When the jam is cleared, the fixing roller pair is rotated in the sheet conveyance direction by the friction between the sheet S and the fixing roller pair. However, since the pawl of the driving-side ratchet 81a is impelled outward and slides over the pawl of the driven-side ratchet 82a, neither the driving gear 81 nor the driving motor 80 is rotated. Therefore, the user can pull out the sheet, which is subjected to only a comparatively small load.

As described above, the driving-side ratchet 81a of this embodiment is movable in the axial direction of the toothed clutch. When the driving-side ratchet 81a has fully engaged the driven-side ratchet 82a in the axial direction of the toothed clutch, i.e., when the pawl of the driving-side ratchet 81a has entered most deeply into the pawl of the driven-side ratchet 82a, the biasing force exerted by the compression spring 86 does not act on the driving-side ratchet 81a.

More specifically, assume that, under a condition wherein the driving-side ratchet 81a has fully engaged the driven-side ratchet 82a, i.e., the pawl of the driving-side ratchet 81a has entered most deeply into the pawl of the driven-side ratchet 82a, the position of the driving-side ratchet 81a at this time is defined as a first position, and the distance between the driving gear 81 and the regulation member 87 is defined as x3 (see FIG. 8). On the other hand, assume that, when the tip end of the pawl of the driving-side ratchet 81a is near the same position as the tip end of the pawl of the driven-side ratchet 82a in the axial direction of the toothed clutch, i.e., when the driven-side ratchet 82a is disengaged from the driving-side ratchet 81a, the position of the driving-side ratchet 81a at this time is defined as a second position, and the distance between the driving gear 81 and the regulation member 87 is defined as x4 (see FIG. 9). When the natural length of the compression spring 86 is defined as h, the apparatus is so designed that a relationship of x3>h>x4 is established.

With this arrangement, when the driving-side ratchet 81a has fully engaged the driven-side ratchet 82a, i.e., when the pawl of the driving-side ratchet 81a has entered most deeply into the pawl of the driven-side ratchet 82a, the biasing force exerted by the compression spring 86 does not act on the driving-side ratchet 81a. Therefore, when the heat roller 21a is rotated as the user is pulling the sheet out of the fixing nip portion, it is possible to prevent the ratchet pawls from forcefully striking each other as the pawl of the driving-side ratchet 81a is rotated near the pawl of the driven-side ratchet 82a. Thus, the frequent occurrence of an impulsive sound can be prevented, and the noise that annoys a user while clearing a jam can be suppressed.

In this embodiment, the compression spring 86 has been employed as a biasing member; however, as in the fourth embodiment, a flat spring may be employed.

Sixth Embodiment

A sixth embodiment of the present invention will now be described. In this embodiment, a driving force transmission apparatus is constituted without providing a biasing member, such as the compression spring described above.

Figure 10:
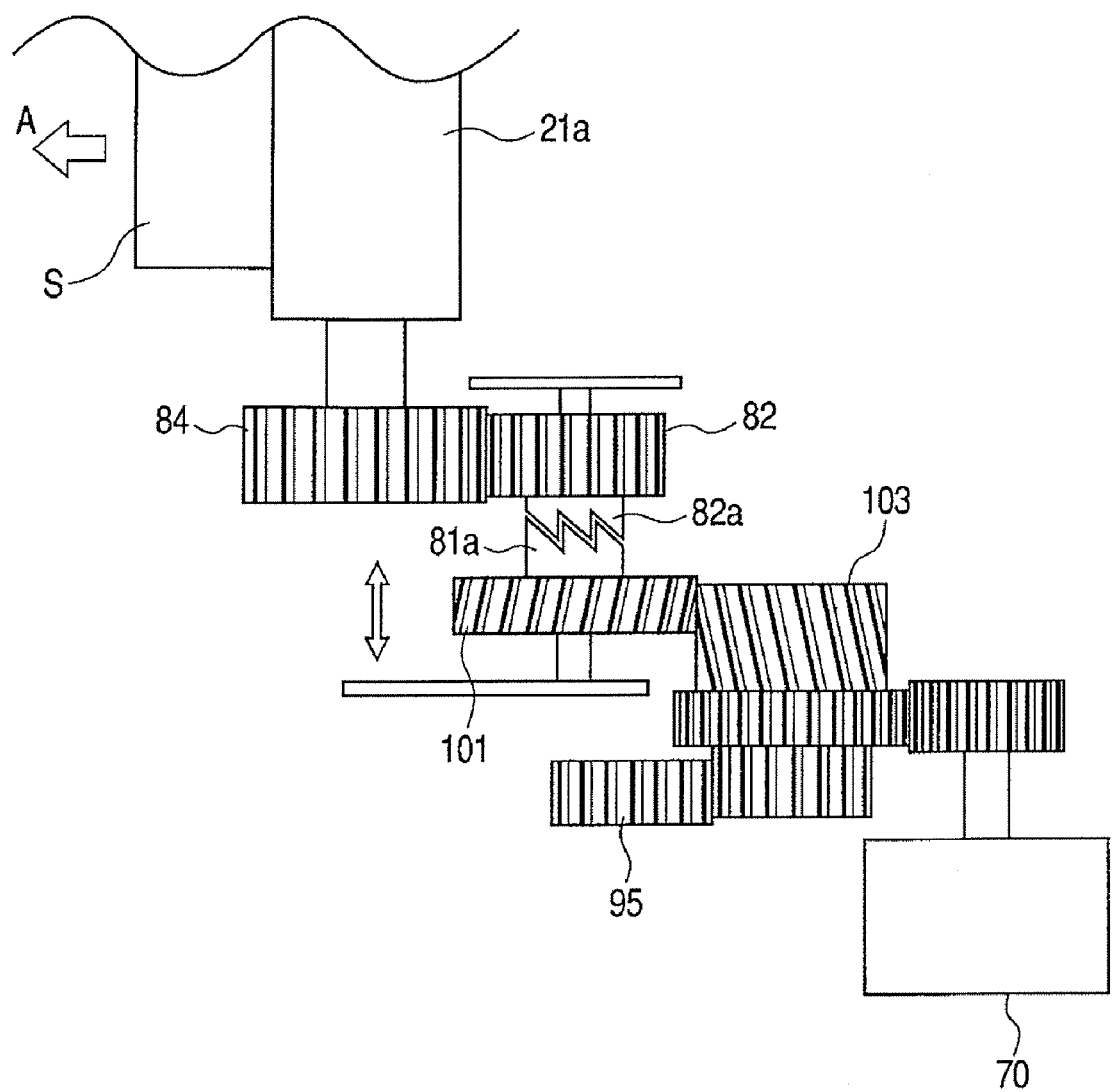
FIG. 10 is a diagram showing a driving force transmission apparatus according to a sixth embodiment of the present invention.

FIG. 10 is a diagram showing the configuration of a driving force transmission apparatus that drives a fixing roller pair, as an example driving force transmission apparatus for this embodiment. In this embodiment, primarily, only a feature that differs from those of the second embodiment will be explained. Further, the same reference numerals are provided for the same components as in the second embodiment, and no further explanation for them will be given.

As shown in FIG. 10, a driving gear 101 and a driven gear 82 are coaxially located between an intermediate gear 103 and a roller gear 84. The driving gear 101 is movable in the axial direction of a toothed clutch, and engages the intermediate gear 103.

Helical gears are employed for the driving gear 101 and the intermediate gear 103, and a torsion angle is designated so that when a driving motor 70 rotates forward, a thrusting force can be generated to move the driving gear 101 toward the driven gear 82. With this arrangement, when the forward rotation of the driving motor 70 is continued, a driving-side ratchet 81a is impelled toward a driven-side ratchet 82a by the force produced by the helical gears. Thus, since the ratchets 81a and 82a are fully coupled, the driving force can more steadily be transmitted. That is, when the driving-side ratchet 81a is rotated upon receiving from the driving source 70 the driving force in a sheet conveyance direction A, the driving gear 101, which is a helical gear, biases the driving-side ratchet 81a toward the driven-side ratchet 82a. In this case, since the driving-side ratchet 81a is gradually impelled toward the driven-side ratchet 82a by the helical gear, it is possible to prevent the generation of an impulsive sound that is produced by the driving-side ratchet 81a striking the driven-side ratchet 82a in the axial direction of the toothed clutch.

Next, an explanation will be given for a case wherein, when the apparatus is halted while a sheet S is sandwiched by the fixing roller pair 21, a user has to pull the sheet S out in the direction indicated by an arrow A shown in FIG. 10.

In this case, the roller gear 84 and the driven gear 82 are rotated rapidly. And when the thus driven gear 82 is rotated rapidly, the pawl of the driving-side ratchet 81a is impelled outward and separated by the pawl of the thus driven-side ratchet 82a, along the torsion angle of the helical gear. Thus, the driven-side ratchet 82a is disengaged from the driving-side ratchet 81a, and is idle.

As described above, according to this embodiment, the driving-side ratchet 81a and the driven-side ratchet 82a can be coupled without the biasing force by a biasing member being required. Therefore, unlike in the conventional case, the driving-side ratchet 81a is not suddenly impelled to the end of the driven-side ratchet 82a by a compression spring, but instead, is gradually impelled inward by the helical gear. Therefore, it is possible to avoid the occurrence of an impulsive sound (a working sound) produced by the driving-side ratchet 81 striking the driving-side ratchet 82a in the axial direction of the toothed clutch.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-286972, filed Sep. 30, 2005 and Japanese Patent Application No. 2006-262979, filed Sep. 27, 2006, which are hereby incorporated by reference herein in their entirety.

What is claimed is:

1. A driving force transmission apparatus comprising:
   a driving gear which rotates by receiving a driving force from a driving source;
   a driven gear which rotates by rotation of said driving gear;
   a toothed clutch which transmits the driving force from said driving source from said driving gear to said driven gear, the toothed clutch including a driving-side ratchet and a driven-side ratchet engageable with the driving-side ratchet and movable between a first position and a second position in an axial direction of the toothed clutch, the first position being a position in which the driven-side ratchet completely engages with the driving-side ratchet in the axial direction of the toothed clutch, the second position being a position in which a tip end of a pawl of the driven-side ratchet is located at a position which is the same as a tip end of a pawl of the driving-side ratchet in the axial direction of the toothed clutch, and
   a biasing member which biases the driven-side ratchet toward the driving-side ratchet,
   wherein, when the driven-side ratchet is located at the second position, a biasing force by the biasing member acts on the driven-side ratchet, and when the driven-side ratchet is located at the first position, the biasing force by the biasing member does not act on the driven-side ratchet.

2. A driving force transmission apparatus according to claim 1, wherein the biasing member is a compression spring.

3. A driving force transmission apparatus according to claim 2, further comprising:
   a regulation member which regulates one end of the compression spring,
   wherein said driven gear and the driven-side ratchet constitute one member, and
   wherein, when x1 denotes a distance between said driven gear and the regulation member when the driven-side ratchet is located at the first position, x2 denotes a distance between said driven gear and the regulation member when the driven-side ratchet is located at the second position, and h denotes a natural length of the compression spring, a relationship shown below is established
   $x1>h>x2$.

4. A driving force transmission apparatus according to claim 1, wherein the biasing member is a flat spring.

5. A driving force transmission apparatus according to claim 1,
   wherein said driven gear is a helical gear, and the helical gear and the driven-side ratchet constitute one member;
   and wherein, when the driven-side ratchet is rotated by receiving the driving force from the driving source in a forward rotation direction, the helical gear biases the driven-side ratchet toward the driving-side ratchet.

6. A driving force transmission apparatus according to claim 1,
   wherein each of the driving-side ratchet and the driven-side ratchet has a pawl whose torsion angle is predetermined, and said driven gear and the driven-side ratchet constitute one member;
   and wherein, when the driven-side rotates by receiving the driving force from the driving source in a forward rotation direction, the pawl biases the driven-side ratchet toward the driving-side ratchet.

7. A sheet conveyance apparatus comprising:
   a driving gear which rotates by receiving a driving force from a driving source;
   a driven gear which rotates by rotation of said driving gear;
   a toothed clutch which transmits the driving force from said driving source from said driving gear to said driven gear, the toothed clutch including a driving-side ratchet and a driven-side ratchet engageable with the driving-side ratchet and movable between a first position and a second position in an axial direction of the toothed clutch, the first position being a position in which the driven-side ratchet completely engages with the driving-side ratchet in the axial direction of the toothed clutch, the second position being a position in which a tip end of a pawl of the driven-side ratchet is located at a position which is the same as a tip end of a pawl of the driving-side ratchet in the axial direction of the toothed clutch;
   a sheet conveyance roller which rotates in associated with said driven gear; and
   a biasing member which biases the driven-side ratchet toward the driving-side ratchet,
   wherein, when the driven-side ratchet is located at the second position, a biasing force by the biasing member acts on the driven-side ratchet, and when the driven-side ratchet is located at the first position, the biasing force by the biasing member does not act on the driven-side ratchet.

8. A sheet conveyance apparatus according to claim 7, wherein the biasing member is a compression spring.

9. A sheet conveyance apparatus according to claim 8, further comprising:

a regulation member which regulates one end of the compression spring, wherein said driven gear and the driven-side ratchet constitute one member, and wherein, when x1 denotes a distance between said driven gear and the regulation member when the driven-side ratchet is located at the first position, x2 denotes a distance between said driven gear and the regulation member when the driven-side ratchet is located at the second position, and h denotes a natural length of the compression spring, a relationship shown below is established x1>h>x2.

10. A sheet conveyance apparatus according to claim 7, wherein the biasing member is a flat spring.

11. A sheet conveyance apparatus according to claim 7, wherein said driven gear is a helical gear, and the helical gear and the driven-side ratchet constitute one member;

and wherein, when the driven-side ratchet rotates by receiving the driving force from the driving source in a forward rotation direction, the helical gear biases the driven-side ratchet toward the driving-side ratchet, and when the driven-side ratchet rotates by receiving a driving force from said sheet conveyance roller in a sheet conveyance direction, the helical gear biases the driven-side ratchet in a direction to which the driven-side ratchet is separated from the driving-side ratchet.

12. A sheet conveyance apparatus according to claim 7, wherein the driving-side ratchet and the driven-side ratchet have pawl shaped portions, for which a torsion angle is designated, and said driven gear and the driven-side ratchet constitute one member;

and wherein, when the driven-side ratchet rotates by receiving the driving force from the driving source in a forward rotation direction, the pawl biases the driven-side ratchet toward the driving-side ratchet, and when the driven-side ratchet rotates by receiving from the sheet conveyance roller a driving force in the sheet conveyance direction, the pawl biases the driven-side ratchet in a direction to which the driven-side ratchet is separated from the driving-side ratchet.

13. A sheet conveyance apparatus comprising:

a driving gear which rotates by receiving a driving force from a driving source;

a driven gear which rotates by rotation of said driving gear;

a toothed clutch which transmits the driving force from said driving source from said driving gear to said driven gear, the toothed clutch including a driving-side ratchet and a driven-side ratchet engageable with the driving-side ratchet and movable in an axial direction of the toothed clutch; and a sheet conveyance roller which rotates in association with said driven gear, wherein said driven gear is a helical gear, and the helical gear and the driven-side ratchet constitute one member;

and wherein, when the driven-side ratchet rotates by receiving the driving force from the driving source in a forward rotation direction, the helical gear biases the driven-side ratchet toward the driving-side ratchet, and when the driven-side ratchet rotates by receiving a driving force from said sheet conveyance roller in a sheet conveyance direction, the helical gear biases the driven-side ratchet in a direction to which the driven-side ratchet is separated from the driving-side ratchet.

14. A driving force transmission apparatus comprising:

a driving gear which rotates by receiving a driving force from a driving source;

a driven gear which rotates by rotation of said driving gear;

a toothed clutch which transmits the driving force from said driving source from said driving gear to said driven gear, the toothed clutch including a driving-side ratchet movable between a first position and a second position in an axial direction of the toothed clutch and a driven-side ratchet engageable with the driving-side ratchet, the first position being a position in which the driving-side ratchet completely engages with the driven-side ratchet in the axial direction of the toothed clutch, the second position being a position in which a tip end of a pawl of the driving-side ratchet is located at a position which is the same as a tip end of a pawl of the driven-side ratchet in the axial direction of the toothed clutch, and a biasing member which biases the driving-side ratchet toward the driven-side ratchet, wherein, when the driving-side ratchet is located at the second position, a biasing force by the biasing member acts on the driving-side ratchet, and when the driving-side ratchet is located at the first position, the biasing force by the biasing member does not act on the driving-side ratchet.

15. A driving force transmission apparatus according to claim 14, wherein the biasing member is a compression spring.

16. A driving force transmission apparatus according to claim 15, further comprising:

a regulation member which regulates one end of the compression spring, wherein said driving gear and the driving-side ratchet constitute one member, and wherein, when x3 denotes a distance between the driving gear and the regulation member when the driving-side ratchet is located at the first position, x4 denotes a distance between the driving gear and the regulation member when the driving-side ratchet is located at the second position, and h denotes a natural length of the compression spring, a relationship shown below is established x3>h>x4.

17. A driving force transmission apparatus according to claim 14, wherein the biasing member is a flat spring.

18. A sheet conveyance apparatus comprising:

a driving gear which rotates by receiving a driving force from a driving source;

a driven gear which rotates by rotation of said driving gear;

a toothed clutch which transmits the driving force from said driving source from said driving gear to said driven gear, the toothed clutch including a driving-side ratchet movable between a first position and a second position in an axial direction of the toothed clutch and a driven-side ratchet engageable with the driving-side ratchet, the first position being a position in which the driving-side ratchet completely engages with the driven-side ratchet in the axial direction of the toothed clutch, the second position being a position in which a tip end of a pawl of the driving-side ratchet is located at a position which is the same as a tip end of a pawl of the driven-side ratchet in the axial direction of the toothed clutch, and a sheet conveyance roller which rotates in associated with said driven gear, a biasing member which biases the driving-side ratchet toward the driven-side ratchet, wherein, when the driving-side ratchet is located at the second position, a biasing force by the biasing member acts on the driving-side ratchet, and when the driving-side ratchet is located at the first position, the biasing force by the biasing member does not act on the driving-side ratchet.

19. A sheet conveyance apparatus according to claim 18, wherein the biasing member is a compression spring.

20. A sheet conveyance apparatus according to claim 19, further comprising:
- a regulation member which regulates one end of the compression spring,
- wherein said driving gear and the driving-side ratchet constitute one member, and
- wherein, when x3 denotes a distance between the driving gear and the regulation member when the driving-side ratchet is located at the first position, x4 denotes a distance between the driving gear and the regulation member when the driving-side ratchet is located at the second position, and h denotes a natural length of the compression spring, a relationship shown below is established x3>h>x4.

21. A sheet conveyance apparatus according to claim 18, wherein the biasing member is a flat spring.

22. A sheet conveyance apparatus comprising:
- a driving gear which rotates by receiving a driving force from a driving source;
- a driven gear which rotates by rotation of said driving gear;
- a toothed clutch which transmits the driving force from said driving source from said driving gear to said driven gear, the toothed clutch including a driving-side ratchet movable in an axial direction of the toothed clutch and a driven-side ratchet engageable with the driving-side ratchet; and
- a sheet conveyance roller which rotates in association with said driven gear,
- wherein said driving gear is a helical gear, and the helical gear and the driving-side ratchet constitute one member; and
- wherein, when the driving-side ratchet rotates by receiving the driving force from the driving source in a forward rotation direction, the helical gear biases the driving-side ratchet toward the driven-side ratchet, and when the driving-side ratchet rotates by receiving a driving force from said sheet conveyance roller in a sheet conveyance direction, the helical gear biases the driving-side ratchet in a direction to which the driving-side ratchet is separated from the driven-side ratchet.

* * * * *